United States Patent [19]
Harmsen et al.

[11] 3,935,988

[45] *Feb. 3, 1976

[54] PROCESS OF PRODUCING SOLDERABLE COMPOSITES CONTAINING AGCDO

[75] Inventors: Ulf O. Harmsen, Pforzheim; Wolfgang S. Pöttken, Keltern-Dietlingen, both of Germany

[73] Assignee: Eugen Durrwachter Doduco, Pforzheim, Germany

[ * ] Notice: The portion of the term of this patent subsequent to Apr. 9, 1991, has been disclaimed.

[22] Filed: June 24, 1974

[21] Appl. No.: 482,071

[30] Foreign Application Priority Data
July 5, 1973 Germany............................. 2334160

[52] U.S. Cl. ................ 228/252; 148/127; 228/231; 228/263; 29/630 C
[51] Int. Cl.² ........................ C22F 1/14; B23K 1/04
[58] Field of Search................. 29/501, 504, 630 C; 200/266, 268, 269; 228/231, 252, 263; 148/127

[56] References Cited
UNITED STATES PATENTS

| | | | |
|---|---|---|---|
| 1,658,713 | 2/1928 | Fuller................................. | 29/630 C |
| 2,730,594 | 1/1956 | Page .................................... | 200/266 |
| 3,288,971 | 11/1966 | Polleys................................ | 200/270 |
| 3,545,067 | 12/1970 | Haarbye et al. ................... | 29/504 X |
| 3,571,546 | 3/1971 | Sedlak .................................. | 200/266 |
| 3,666,428 | 5/1972 | Haarbye............................. | 29/195 Y |
| 3,802,062 | 4/1974 | Harmsen et al...................... | 29/501 |
| 3,807,994 | 4/1974 | Jost................................... | 148/127 X |
| 3,880,608 | 4/1975 | Haarbye.......................... | 228/263 X |

FOREIGN PATENTS OR APPLICATIONS 1,090,484   10/1960   Germany

*Primary Examiner*—Al Lawrence Smith
*Assistant Examiner*—K. J. Ramsey

[57] ABSTRACT

A process for making a solderable composite body containing silver cadmium oxide comprising forming an assembly having an intermediate layer of a silver copper alloy located between a layer of a silver cadmium alloy and a layer of silver of silver alloy, welding the layers together, and subsequently oxidizing the cadmium.

1 Claim, No Drawings

PROCESS OF PRODUCING SOLDERABLE COMPOSITES CONTAINING AGCDO

This invention relates to an improvement in or modification of the process of manufacturing a solderable composite body containing silver cadmium oxide described in applicant's U.S. Pat. No. 3,802,062 issued Apr. 9, 1974. That Patent discloses a process of manufacturing a solderable composite body containing silver cadmium oxide comprising the steps of forming an assembly having an intermediate layer of a silver copper alloy located between and in contact with a layer of a silver cadmium alloy and a layer of silver or silver alloy, welding the layers together, and subsequently internally oxidising the cadmium, wherein the welding step comprises pressing the block at an elevated temperature until the silver copper alloy is transferred into a pasty S + $\alpha$ phase.

According to the present invention, in a process of manufacturing a solderable composite body containing silver cadmium oxide comprising the steps of forming an assembly having an intermediate layer of a silver copper alloy located between and in contact with a layer of a silver cadmium alloy and a layer of silver or silver alloy, welding the layers together, and subsequently internally oxidising the cadmium, the welding step comprises heating the assembly until the occurrence of a pasty S + $\alpha$ phase of the silver copper alloy.

It has been found by test that it is unnecessary to apply pressure to the assembly for welding: the layers can be welded simply by heating.

EXAMPLE 1

An AgCd alloy with a cadmium content of 13.4 percent by weight and a grain refining nickel additive of 0.2 percent by weight are melted, cast into a bar and rolled to a plate with the dimensions 190mm by 130mm by 50mm. The surface to be plated is brushed clean. On to this brushed surface, there is laid a plate of $AgCu_2O$ 0.4mm thick, and upon this a silver plate 7.5mm thick. This assembly is heated in a retort furnace until the occurrence of a pasty (s + $\alpha$) phase of the silver-copper alloy. It has been found that this heating step alone, is sufficient to provide a very satisfactory connection between the layers of the assembly, and there is no need for the application of pressure for welding of the assembly. The welded assembly is rolled down to 30mm, annealed in a salt bath, and rolled a further 50 percent until it reaches a thickness of 2mm. Plates are stamped out of the strip and internally oxidised at 800°C at less than 3 Kilograms per square centimeter above atmospheric pressure for 15 hours. After internal oxidation, no bubbles are visible on the silver layer, and no oxide lines and concentrations in the plated zone. By a breakage test, it is shown that the silver layer cannot be drawn off.

EXAMPLE 2

A plate of AgCd 9 with 0.2 percent by weight of Ni, which plate has dimensions of 190mm be 130mm by 50mm, is brushed clean on one side, and a plate of AgCu 15 0.4mm thick is placed on the former, and on the AgCu side there is placed an Ag plate 5mm thick, thereupon an AgCu15 plate 0.4mm thick, and then a nickel plate 10mm thick. This packet of plates is heated in a protective gas until it reaches a pasty (s + $\alpha$) phase of the silver-copper alloy. A satisfactory connection is obtained between the layers without the need for pressure. The welded plate packet is then hammered to 50mm thick and then rolled with additional intermediate annealings in a salt bath to a plate thickness of 2mm. The strip is internally oxidised at 800°C at 3 Kilograms per square centimeter above atmospheric pressure for 10 hours.

The scale occurring on the nickel side is burned and ground off. In this way a solderable strip material is obtained which can be directly further processed, or out of which welding contacts can be stamped.

By way of explanation, the expression "S + $\alpha$ phase" referred to hereinbefore denotes a "pasty" state. The "S" comes from the German "Schmelze" meaning "melting". The "$\alpha$" has reference to the solid phase. Hence "S + $\alpha$" is between molten and solid.

We claim:

1. A process of manufacturing a solderable composite body containing silver cadmium oxide comprising the steps of forming an assembly having an intermediate layer of a silver copper alloy located between and in contact with a layer of a silver cadmium alloy and a layer of silver or silver alloy, welding the layers together, and subsequently internally oxidizing the cadmium, wherein the welding step comprises heating the assembly until the occurrence of a pasty S + $\alpha$ phase of the silver-copper alloy.

* * * * *